US012803379B2

(12) United States Patent
Alm et al.

(10) Patent No.: US 12,803,379 B2
(45) Date of Patent: Nov. 17, 2026

(54) HYDRAULICALLY BRAKEABLE ELECTRICAL MACHINE

(71) Applicant: VOLVO TRUCK CORPORATION, Gothenburg (SE)

(72) Inventors: Ivar Alm, Öckerö (SE); John Lord, Olofstorp (SE); Rasmus Andersson, Hisings Backa (SE); Ronald Susic, Gothenburg (SE); Zhe Huang, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 156 days.

(21) Appl. No.: 18/582,760

(22) Filed: Feb. 21, 2024

(65) Prior Publication Data

US 2024/0297552 A1 Sep. 5, 2024

(30) Foreign Application Priority Data

Mar. 2, 2023 (EP) .................................... 23159543

(51) Int. Cl.
*H02K 7/12* (2006.01)
*H02K 5/20* (2006.01)
*H02K 7/14* (2006.01)
*H02K 9/19* (2006.01)

(52) U.S. Cl.
CPC ............... *H02K 7/12* (2013.01); *H02K 5/203* (2021.01); *H02K 7/14* (2013.01); *H02K 9/19* (2013.01); *H02K 2205/09* (2013.01)

(58) Field of Classification Search
CPC ............ H02K 7/12; H02K 7/125; H02K 7/14; H02K 5/203; H02K 9/19; H02K 9/193; H02K 9/20; H02K 2205/09; H02K 2205/12
USPC ........................................ 310/76, 77, 92, 93
See application file for complete search history.

(56) References Cited

U.S. PATENT DOCUMENTS

| | | | | | |
|---|---|---|---|---|---|
| 3,588,284 | A * | 6/1971 | Sturlason | F04C 2/102 417/61 |
| 5,418,412 | A * | 5/1995 | Brucker | H02K 9/24 310/119 |
| 2022/0135007 | A1* | 5/2022 | Schidlowski | B60K 1/00 188/2 R |
| 2022/0190678 | A1 | 6/2022 | Folkesson | |
| 2023/0179066 | A1* | 6/2023 | Toliyat | H02K 21/24 310/54 |

FOREIGN PATENT DOCUMENTS

| | | | |
|---|---|---|---|
| CN | 207049235 | U | 2/2018 |
| SE | 541864 | C2 | 1/2020 |
| WO | 2021099156 | A1 | 5/2021 |

OTHER PUBLICATIONS

Extended European Search Report in corresponding European Application No. 23159543.0 dated Jul. 24, 2023 (10 pages).

* cited by examiner

*Primary Examiner* — Michael Andrews
(74) *Attorney, Agent, or Firm* — Jeffri A. Kaminski; Venable LLP

(57) ABSTRACT

An electrical machine is presented. The electrical machine comprises a rotor, a stator, a housing and a fluid circuit provided between an interior of the housing and the rotor axially along a longitudinal axis of the rotor. The fluid circuit is adapted to, by means of a fluid in the fluid circuit, exert a braking torque on the rotor.

14 Claims, 5 Drawing Sheets

HYDRAULICALLY BRAKEABLE ELECTRICAL MACHINE

TECHNICAL FIELD

The disclosure relates generally to electrical machines. In particular aspects, the disclosure relates to hydraulically breakable electrical machines. The disclosure can be applied to general electrical machines and in particular to electrical propulsion machines for heavy-duty vehicles, such as trucks, buses, and construction equipment, among other vehicle types. Although the disclosure may be described with respect to a particular vehicle, the disclosure is not restricted to any particular vehicle.

BACKGROUND

Modern vehicles may be provided with electrical machines. One particular use of electric machines in vehicles is for traction purpose, i.e. the electrical machines are arranged as part of the drive train to perform the desired propulsion of the vehicle. These electrical machines are connected to one or more battery arrangements which provide the electrical machines with the required electrical power.

Electrical machines can also be used to provide retardation of the vehicle, changing the operational mode of the electrical machine from propulsion mode to regeneration mode. In such case the regeneration of electrical power will cause a retarding effect on the vehicle.

Other electrical machines may be used as alternators being operatively connected to a propulsion source of the vehicle and configured to generate electrical power therefrom.

However, braking of the electric vehicle using the electrical machine or storing electrical power from the alternator can only be performed as long as an associated battery arrangement is capable of receiving the (re)generated electrical power. If the battery arrangement is fully (or close to fully) charged, braking can no longer be achieved by means of the electrical machine.

Based on this, there is a need for improved solutions enabling the electrical machine of a vehicle to brake the vehicle even if the associated battery arrangement is not capable of receiving the generated electrical power.

SUMMARY

In a first aspect, an electrical machine is presented. The electrical machine comprises a rotor, a stator, a housing and a fluid circuit provided between an interior of the housing and the rotor axially along a longitudinal axis of the rotor, a width extension of the fluid circuit axially along the longitudinal axis of the rotor is defined by a first surface and a second surface facing each other. The fluid circuit is adapted to, by means of a fluid in the fluid circuit, exert a braking torque on the rotor. A technical benefit may comprise providing a braking effect internal to the electrical machine with very few design modifications to the electrical machine.

In some examples, including in at least one preferred example, optionally, the first surface is provided by a surface of the rotor. Using a surface of the rotor as part of the fluid circuit is advantageous as a hydraulic brake may be provided with very few design modifications on the electrical machine.

In some examples, including in at least one preferred example, optionally, the first surface and the second surface are respectively provided with one or more vanes adapted to fluidly engage vanes of the other surface to provide a viscous drag between the surfaces. This is advantageous as the vanes will increase a flow of the fluid and thereby increase the viscous drag and the braking of the rotor.

In some examples, including in at least one preferred example, optionally, the second surface is provided by a surface of the housing. This is advantageous as a hydraulic brake internal to the electrical machine may be provided with very few design modifications to the electrical machine.

In some examples, including in at least one preferred example, optionally, the fluid circuit further comprises an intermediate part rotatably arranged on the longitudinal axis of the rotor axially between the rotor and the housing, the second surface is provided by a surface of the intermediate part. This is advantageous as it increases the controllability of the viscous drag and the braking effect of the fluid circuit.

In some examples, including in at least one preferred example, optionally, the first surface and/or the second surface is movable along the rotational axis to control the width extension of the fluid circuit. This is advantageous as it increases the controllability of the viscous drag and the braking effect of the fluid circuit.

In some examples, including in at least one preferred example, optionally, the fluid circuit further comprises a substantially constant amount of fluid. This is advantageous as fewer parts are required, decreasing a cost of the electrical machine and increasing the up-time of the electrical machine as fewer parts decrease a risk of component facility statistically increasing a mean time between failures.

In some examples, including in at least one preferred example, optionally, the fluid circuit further comprises at least one fluid inlet for receiving the fluid into the fluid circuit and at least one fluid outlet for draining the fluid from the fluid circuit. This is advantageous as it increases the controllability of the viscous drag and the braking effect of the fluid circuit.

In some examples, including in at least one preferred example, optionally, the fluid circuit 130 forms part of a cooling system of the electrical machine. This is advantageous as it decreases a need of providing additional fluid circuitry for cooling.

In some examples, including in at least one preferred example, optionally, the electrical machine further comprises a Water Ethanol Glycol, WEG, cooling system. This is advantageous as it decreases a need of providing additional fluid circuitry for cooling.

In some examples, including in at least one preferred example, optionally, the fluid circuit is arranged at a side of the stator proximal to a drive shaft of the electrical machine. This is advantageous as a hydraulic brake internal to the electrical machine may be provided with very few design modifications to the electrical machine.

In some examples, including in at least one preferred example, optionally, wherein the fluid circuit is arranged at a side of the stator distal to a drive shaft of the electrical machine. This is advantageous as a hydraulic brake internal to the electrical machine may be provided with very few design modifications to the electrical machine.

In some examples, including in at least one preferred example, optionally, the electrical machine is a propulsion motor for a vehicle. This is beneficial as a hydraulic retarder may be provided without substantially changing a cost of the vehicle, a weight of the vehicle or a number of components of the vehicle.

In some examples, including in at least one preferred example, optionally, the electrical machine is an alternator. This is beneficial as a hydraulic retarder may be provided without substantially changing a cost of the vehicle, a weight of the vehicle or a number of components of the vehicle.

In some examples, including in at least one preferred example, optionally, a width extension of the fluid circuit axially along the longitudinal axis of the rotor is defined by a first surface and a second surface facing each other. The first surface is provided by a surface of the rotor. The first surface and the second surface are respectively provided with one or more vanes adapted to fluidly engage vanes of the other surface to provide a viscous drag between the surfaces. The second surface is provided by a surface of the housing or the fluid circuit further comprises an intermediate part rotatably arranged on the longitudinal axis of the rotor axially between the rotor and the housing, the second surface is provided by a surface of the intermediate part. The first surface and/or the second surface is movable along the rotational axis to control the width extension of the fluid circuit, preferably. The fluid circuit further comprises a substantially constant amount of fluid or the fluid circuit further comprises at least one fluid inlet for receiving the fluid into the fluid circuit and at least one fluid outlet for draining the fluid from the fluid circuit. The fluid circuit is arranged at a side of the stator proximal to a drive shaft of the electrical machine or wherein the fluid circuit is arranged at a side of the stator distal to a drive shaft of the electrical machine. The electrical machine is a propulsion motor for a vehicle or an alternator for the vehicle.

In a second aspect, a vehicle comprising the electrical machine according to the first aspect is presented.

In some examples, including in at least one preferred example, optionally, the electrical machine comprises at least one fluid inlet for receiving the fluid into the fluid circuit and at least one fluid outlet for draining the fluid from the fluid circuit. The fluid inlet and fluid outlet are operatively connected to a temperature system of the vehicle. This is advantageous as heat generated by the fluid circuit may be utilized to heat the vehicle and the vehicle may in turn cool the fluid to reduce a risk of the fluid over heating during braking.

In a third aspect, a method of exerting a braking torque on the rotor of an electrical machine is presented. The electrical machine is the electrical machine of the first aspect and the method comprises controlling a viscous drag of the fluid circuit.

In some examples, including in at least one preferred example, optionally, controlling a viscous drag of the fluid circuit comprises providing fluid at an inlet of the fluid circuit and/or draining fluid at an outlet of the fluid circuit. This is advantageous as it increases the controllability of the viscous drag and the braking effect of the fluid circuit.

In some examples, including in at least one preferred example, optionally, controlling a viscous drag of the fluid circuit comprises a controlling a width extension of the fluid circuit, the width extension is defined along the longitudinal axis by a distance between a first surface and an opposing second surface of the fluid circuit. This is advantageous as it increases the controllability of the viscous drag and the braking effect of the fluid circuit.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Details of an electrical machine will be described in the following. The electrical machine according to the present disclosure aims to add a braking functionality to the electrical machine by utilizing oil or any other suitable fluid. Such oil may be oil already provided to e.g., cool down the electrical machine during operation. By implementing the electrical machine in a vehicle, a braking force may be applied to the vehicle by means of the electrical machine even if regeneration of electrical power is not available due to e.g. the associated battery arrangement being fully, or almost fully, charged.

Figure 1:
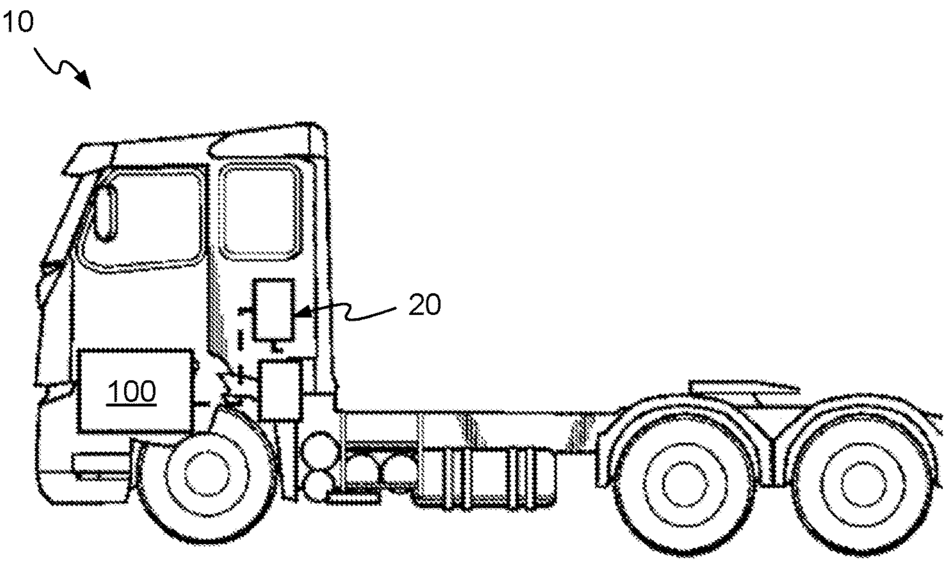
FIG. 1 is an exemplary side view of a vehicle according to some examples.

With reference to FIG. 1, a vehicle 10, here embodied as a heavy duty truck 10, is disclosed for which an electrical machine 100 and a method 200 (see FIG. 10) for braking an electrical machine 100 are advantageous. However, the electrical machine 100 and/or the method 200 may as well be implemented in other types of applications, in particular in other types of vehicles such as busses, light-weight trucks, passenger cars, marine applications, etc.

The vehicle 10 is preferably an electric vehicle, such as a full electric vehicle or a hybrid vehicle, comprising at least one electrical machine 100 for propulsion. Typically the vehicle 10 also comprises an energy storage system 20 comprising energy storage or energy transformation devices, typically batteries or fuel cells. The energy storage system 20 is arranged and configured to power the electrical machine 100.

The vehicle 10 typically further comprises other parts of a powertrain such as a transmission, drive shafts, and wheels (not shown in details in FIG. 1).

Figure 2:
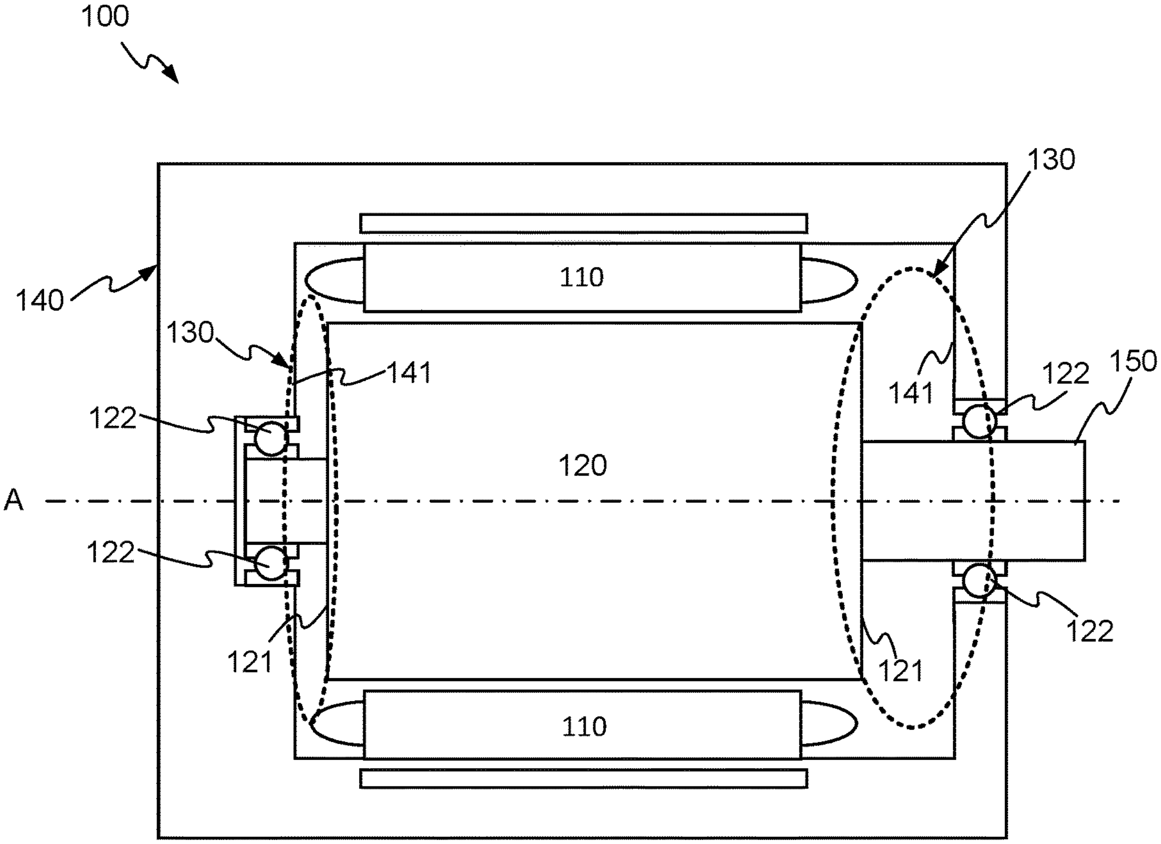
FIG. 2 is an exemplary cross-sectional view of an electrical machine according to some examples.

An example of an electrical machine 100 is shown in FIG. 2. The electrical machine 100 has a rotor 120, a stator 110, and a housing 140. The rotor 120 is rotatably supported by the housing 140 e.g. by means of one or more bearings 122, allowing the rotor 120 to rotate around a rotational axis A which advantageously is aligned with a longitudinal axis A of the rotor 120. The stator 110 is also enclosed by the housing 130 and arranged radially to the rotational axis A outside of the rotor 110.

The electrical machine 100 is further provided with at least one and fluid circuit 130. The fluid circuit 130 is provided between an interior of the housing 140 and the rotor 120 axially along the longitudinal axis A of the rotor 120. In FIG. 2, the electrical machine 100 comprises two fluid circuits 130, one at each axial end of the rotor 120. However, as will be apparent from the present disclosure, examples with only one fluid circuits 130 or more than two fluid circuits 130 are well within the scope of the present disclosure.

The fluid circuit 130 is adapted to, by means of a fluid 102 (see FIG. 8) in the fluid circuit 130, exert a braking torque on the rotor 120. In other words, the fluid circuit 130 may function as a hydraulic retarder, providing a braking effect on the rotor 120 by viscous drag from the fluid 102 and inertia effects of the fluid 102 being thrown between moving and stationary surfaces.

Hydraulic retarders are well known in the art and use viscous drag forces between dynamic and static members in a fluid-filled chamber to achieve retardation. Hydraulic retarders are extremely quiet and when used in combustion vehicles, substantially inaudible over the sound of a running engine. For electric or hybrid vehicles 10, reducing noise is an important factor as the comfort, silence and working environment of electric and hybrid vehicles 10 are some key features in selecting an electric or hybrid vehicle 10.

Having such a fluid circuit internal to the electrical machine 100 will reduce a number of components of a vehicle 10 using the electrical machine 100 as no external hydraulic retarder is required. It should be mentioned that the electrical machine 100 of the present disclosure may very well be combined with an external retarder of any suitable size, shape or form (e.g. hydraulic, exhaust etc.). As will be apparent form the present disclosure, the fluid circuit 130 is a comparably minor modification to a general electrical machine which means that only minor changes are required in a production process in order to transform a general electrical machine into an electrical machine 100 comprising the fluid circuit 130 of the present disclosure. Further, having external hydraulic retarders will not only increase cost of a vehicle, weight will increase and mean time between failures will decrease as more components are available that may potentially break or require service.

In FIG. 2, the fluid circuits 130 are defined at a first end along the rotational axis A by a first surface 121 that is an axial surface of the rotor 120. The fluid circuits 130 are defined at a second, opposite, end along the rotational axis A by a second surface 141 that is a radial surface of the housing 140. The first and second surfaces 121, 141 of each fluid circuit 130 face each other. As the rotor 120 rotates, the first surface 121 will rotate with it and stir, splash or otherwise excite fluid 102 in the fluid circuit 130. The opposite second surface 141 (in FIG. 2 on the housing 140) is stationary and will prevent or reduce the movement of the fluid 102 causing the viscous drag.

The amount of viscous drag may be controlled by one or more parameters of the fluid circuits 130. One such parameter is a width extension w of the fluid circuit 130, see FIG. 3, i.e. an axial distance between the rotating surface, the first surface 121 of the rotor 120, and a stationary surface, the second surface 141 of the housing 140. The shorter the width extension w, the higher the viscous drag, i.e. braking torque, assuming a constant amount of fluid 102 in the fluid circuit 130. In order to control the width extension w, the rotor 120 may axially movable to alter the width extension w. Advantageously, the axial position of the second surface 141 of the housing 140 may be controlled by suitable arrangements external to electrical machine 100 and/or by arrangements internal to the electrical machine 100. To exemplify, the second surface 141 of the housing 140 may be pneumatically and/or electronically controlled (e.g. by means of suitable actuators) between two discrete axial positions (or stepwise or continuously between two extreme axial positions), wherein a first position exhibits a reduced width extension w compared to a second position. At the first position, the width extension w is sufficiently short such that a viscous drag is provided between the first surface 121 and the second surface 141 due to rotation of the first surface 121. At the second position, the width extension w is sufficiently long such that substantially no viscous drag is provided between the first surface 121 and the second surface 141 due to rotation of the first surface 121. The dimensioning of the width extension w in relation to a viscous drag will depend on e.g. a rotational speed of the rotor 120, however, the particulars of designing a hydraulic retarder are well known in the art and will not be further detailed herein. It should be mentioned that, although it may result in a more complex design, axial movement of the rotor 120 similar to the axial movement of the second surface 141 of the housing 140 is well within the scope of the present disclosure.

Figure 4:
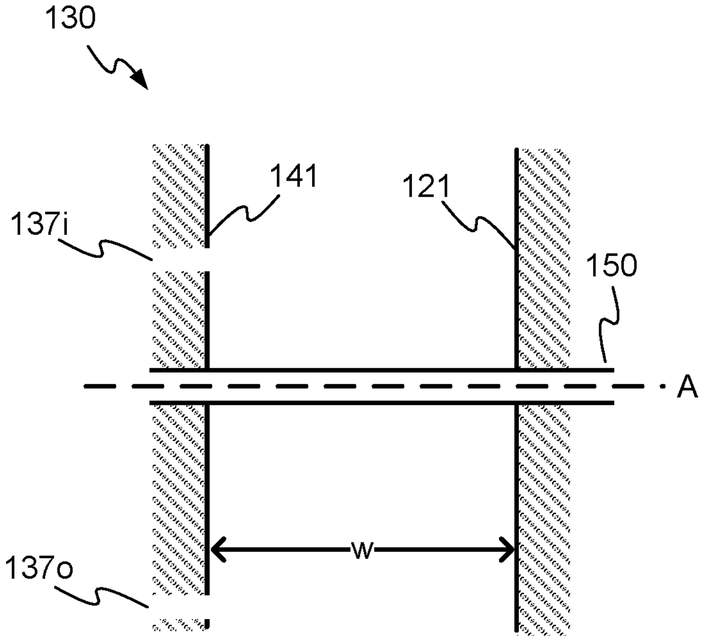
FIG. 4 is an exemplary cross-sectional view of a fluid circuit according to some examples.

As indicated above, the braking effect exerted by the fluid circuit 130 may depend on an amount of fluid 102 in the fluid circuit 130. In FIG. 4, an exemplary fluid circuit 130 with a controllable amount of fluid is schematically shown. In this example, the fluid circuit 130 comprises at least one fluid inlet 137*i* for receiving the fluid 102 into the fluid circuit 130. The fluid inlet 137*i* allows for increase of an amount of fluid 102 in the fluid circuit 130. Advantageously, the fluid circuit 130 further comprises at least one fluid outlet 137*o* for draining the fluid 102 from the fluid circuit 130. By increasing an amount of fluid 102 in the fluid circuit 130, the viscous drag is increased. By decreasing an amount of fluid 102 in the fluid circuit 130, the viscous drag is decreased.

Depending on how the fluid inlet 137*i* and/or fluid outlet 137*o* are connected externally to the electrical machine 100, only one of the fluid inlet 137*i* or the fluid outlet 137*o* is required to fully control an amount of fluid 102 in the fluid circuit 130. By having a fluid pump connected to a fluid port 137*i*, 137*o* (may be either the fluid inlet 137*i* or the fluid outlet 137*o*) and configured to pump fluid into the fluid circuit 130 via the fluid port 137*i*, 137*o* when a braking effect is desired. When the braking effect is not desired, the fluid pump may be configured to seize pumping and revert to sucking the fluid 102 from the fluid chamber and/or fluid 102 may be drained from the fluid circuit 130 by e.g. gravity and residual rotation of the rotor 120. One or more valves may be connected the fluid inlet 137*i* and/or the fluid outlet 137*o* to control the flow of fluid 102 in and/or out from the fluid circuit 130.

Figure 3:
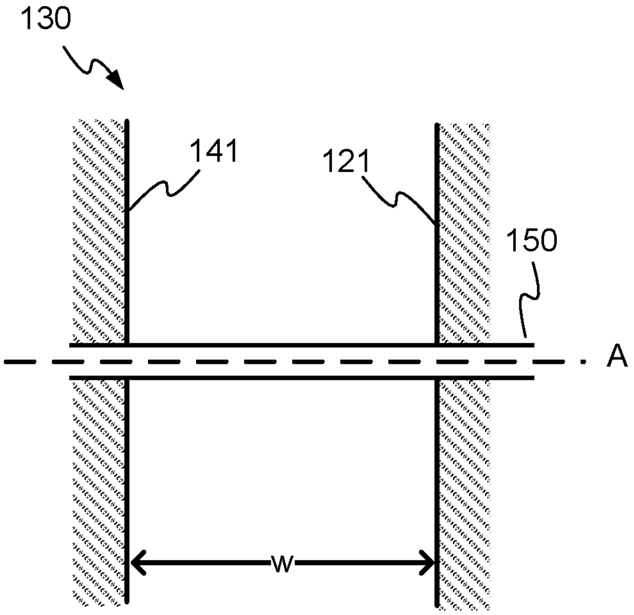
FIG. 3 is an exemplary cross-sectional view of a fluid circuit according to some examples.

It should be mentioned that the width controlled introduced with reference to FIG. 3 and the fluid control introduced with reference to FIG. 4 may very well be combined in order to further increase a controllability of the braking torque on the rotor 120.

Figure 5A:
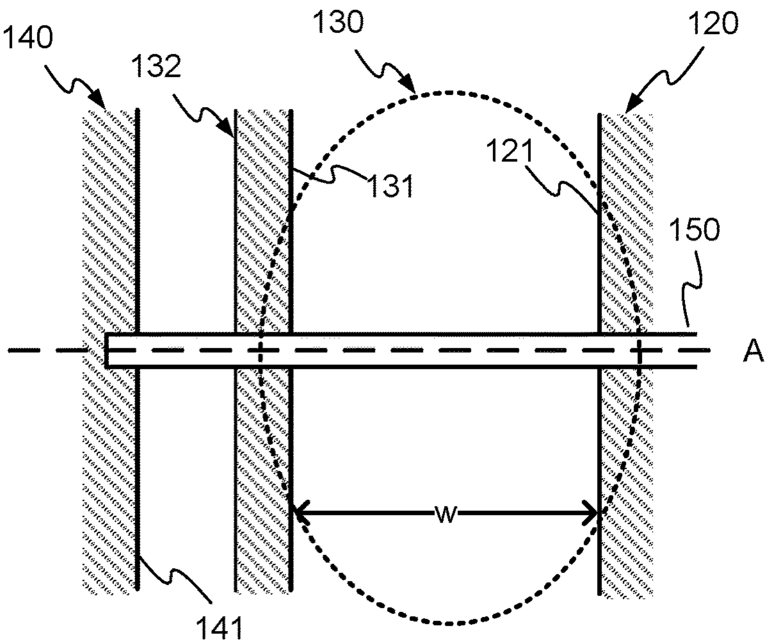
FIGS. 5A-B are exemplary cross-sectional views of fluid circuits according to some examples.
Figure 5B:
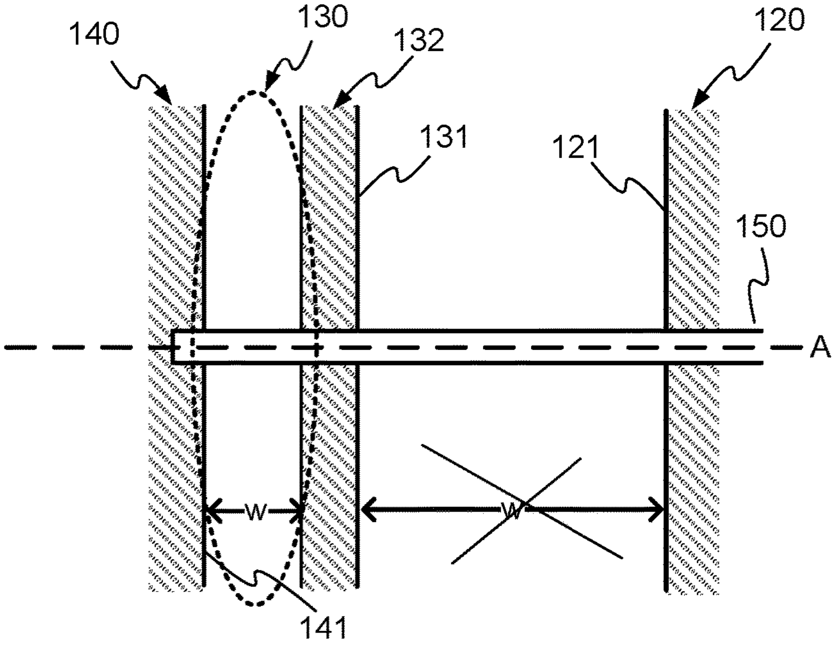

In FIGS. 5A-B, a further exemplary fluid circuit 130 of an electrical machine 100 is shown. In this example, the fluid circuit 130 comprises an intermediate part 132 arranged axially between the rotor 120 and the housing 140. The intermediate part 132 is arranged around the rotational axis A of the electrical machine 100 and advantageously extends radially around the rotational axis A. The intermediate part 132 is advantageously disc-shaped. The intermediate part 132 is provided with a first surface 131 facing the first surface 121 of the rotor 120. The intermediate part 132 is provided with a second surface 132 facing the radial surface 141 of the housing 140.

In FIG. 5A, the first surface 121 of the fluid circuit 130 is provided by the radial surface 121 of the rotor 120. The second surface 131 of the fluid circuit 130 is provided by the first surface 131 of the intermediate part 132. In this example, the viscous drag of the fluid circuit 130 may be controlled by controlling the amount of fluid 102 in the fluid circuit 130 and/or axially moving the rotor 120 as mentioned above. Additionally, or alternatively, the viscous drag may be controlled by axially moving the intermediate part 132 to change the width extension w of the fluid circuit.

In an advantageous example, the intermediate part 132 is rotatably arranged on the longitudinal axis A of the rotor 120. This is to mean that the intermediate portion 132 may rotate around the longitudinal axis A independently of the rotation of the rotor 120. Advantageously, the rotation of the intermediate part 132 around the rotational axis A may be controlled. Specifically, the rotation of the intermediate part 132 around the rotational axis A may be prevented. In a first mode of operation, the intermediate part 132 is permitted to rotate freely which means that any viscous drag produced by the rotation of the rotor 120 will cause the intermediate part 132 to rotate. At a second mode of operation, the intermediate part 132 is prevented from rotating which means that any viscous drag produced by the rotation of the rotor 120 will cause a braking torque on the rotor 120. The intermediate part 132 may be prevented from rotating by e.g. a suitable locking mechanism engaging the intermediate part 132 form the housing 140.

It should be mentioned that that, if the intermediate part 132 is permitted to around the longitudinal axis A independently of the rotation of the rotor 120, the intermediate part may be configured to function as a fly-wheel of the electrical machine 100. If the intermediate part 132 is not prevented from rotating, a decrease in rotational speed of the rotor 120 will be counteracted by the intermediate part 132. The intermediate part 132 may be compared to having a kinetic energy recovery system (KERS) integrated in the electrical machine 100.

In FIG. 5A, the fluid circuit 130 is provided between the intermediate part 132 and the rotor 120. In FIG. 5B, the fluid circuit 130 is provided between the intermediate part 132 and the housing 140. To this end, the first surface 132 of the fluid circuit 130 is provided by the second surface 132 of the intermediate part 132. The second surface 141 of the fluid circuit 130 is provided by the radial surface 141 of the housing 140. In this example, the viscous drag of the fluid circuit 130 may be controlled by controlling the amount of fluid 102 in the fluid circuit 130, axially moving the rotor 120 and/or the intermediate part 132 as mentioned above.

It should be mentioned that the electrical machine 100 may very well be provided with a fluid circuit 130 at either axial side of the intermediate part 132.

Figure 6:
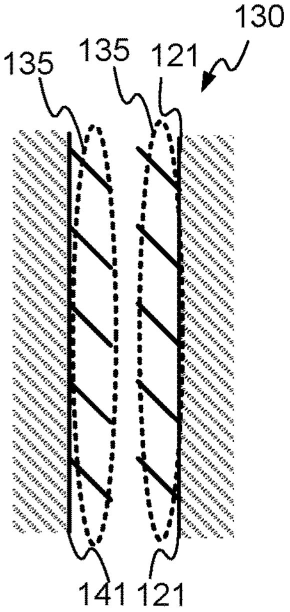
FIG. 6 is an exemplary cross-sectional view of a fluid circuit according to some examples.

In FIG. 6 a cross-sectional view of a partial fluid circuit 130 is shown. The fluid circuit 130 is formed by the stator 120 and the housing, but the particulars of FIG. 6 are usable with any fluid circuit 130 presented herein. In FIG. 6, the first surface 141 and the second surface 141 of the fluid circuit 130 are respectively provided with a plurality of vanes 135. The vanes 135 are adapted to fluidly engage vanes 135 of the other surface opposite surface 121, 141 to provide an increased viscous drag between the surfaces 121, 141. The vanes 135 in FIG. 6 extend at an angle from their respective surface 121, 141. The angle of the vanes will depend on requirements on the hydraulic retardation and dimensioning of these is known to the skilled person. Further, the vanes may extend radially along their respective surfaces 121, 141. The radial extension may be straight or curved depend on requirements on the hydraulic retardation. Advantageously, the vanes 135 are configured to cause the fluid 102 to have a spiraling flow which increases the viscous drag and inertia effects.

Although FIG. 6 shows both radial surfaces of the fluid circuit 130 provided with vanes 135, the skilled person appreciates that examples with only one surface provided with vanes is also within the scope of the present disclosure.

Figure 7:
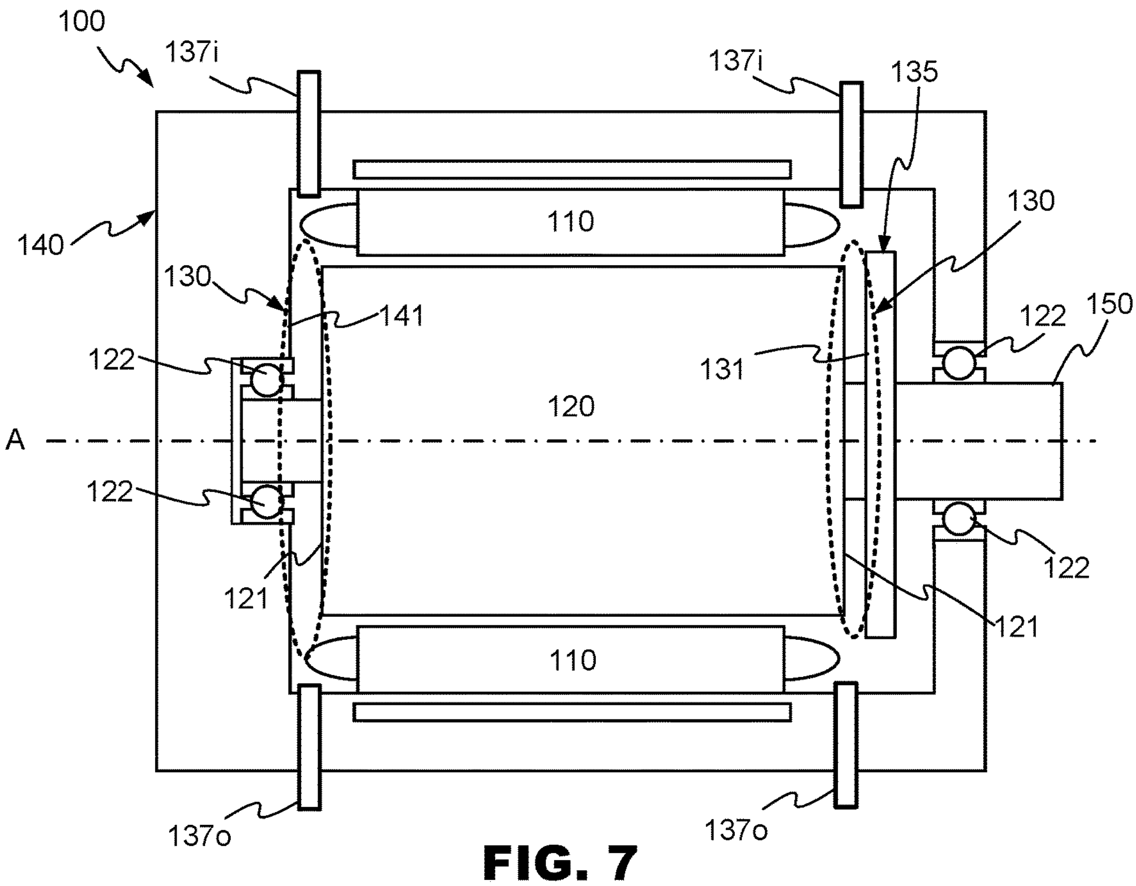
FIG. 7 is an exemplary cross-sectional view of an electrical machine according to some examples.

In FIG. 7, a further exemplary electrical machine 100 is shown. The electrical machine comprises two fluid circuits 130. A first fluid circuit 130 is provided at an axial side of the rotor 120 being proximate to a drive shaft 150 of the electrical motor 100. A second fluid circuit 130 is provided at an axial side of the rotor 120 being distal to a drive shaft 150 of the electrical motor 100. The first fluid circuit 130 is formed axially between the stator 102 and an intermediate portion 132 as previously presented. The second fluid circuit 130 is formed between the stator 120 and the radial surface 141 of the housing 140. Each of the fluid circuits 130 is provided with an inlet 137*i* and an outlet 137*o*.

Figure 8:
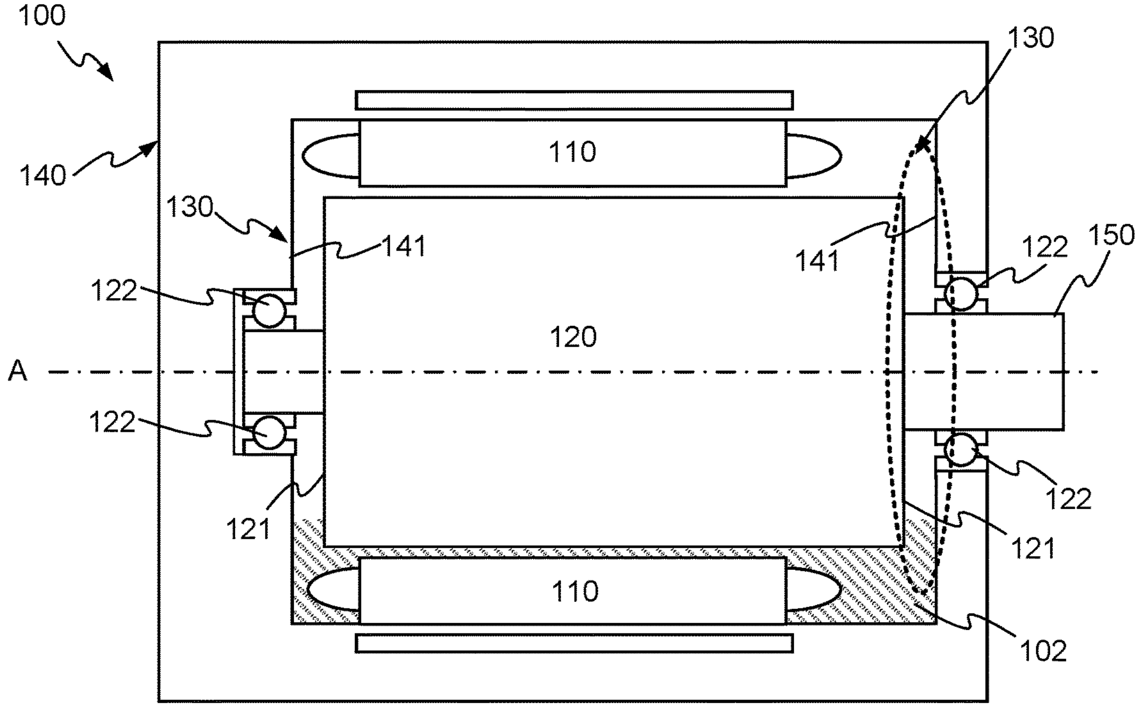
FIG. 8 is an exemplary cross-sectional view of an electrical machine according to some examples.

FIG. 8 shows an electrical machine 100 according the present disclosure. The electrical machine 100 comprises a rotor 120, a stator 110, a housing 140 and a fluid circuit 130 provided between an interior of the housing 140 and the rotor 120 axially along a longitudinal axis A of the rotor 120. The fluid circuit 130 is adapted to, by means of a fluid 102 in the fluid circuit 130, exert a braking torque on the rotor 120.

Many electrical machines known in the art comprise cooling systems adapted to e.g. cool windings of the electrical machine. In some examples, the electrical machine may comprising such a cooling system (not shown) and the fluid circuit 130 is advantageously configured to form part of the cooling system. In some examples, the cooling system is a Water Ethanol Glycol (WEG) cooling system (not shown).

Returning to FIG. 1, wherein a vehicle 10 comprising the electrical machine 100 was shown. The electrical machine 100 is advantageously a propulsion motor 100 of the vehicle 10, but may, in some examples, be an alternator of the vehicle 10. Regardless, the electrical machine 100 may be the electrical machine 100 according to any suitable example presented herein.

Figure 9:
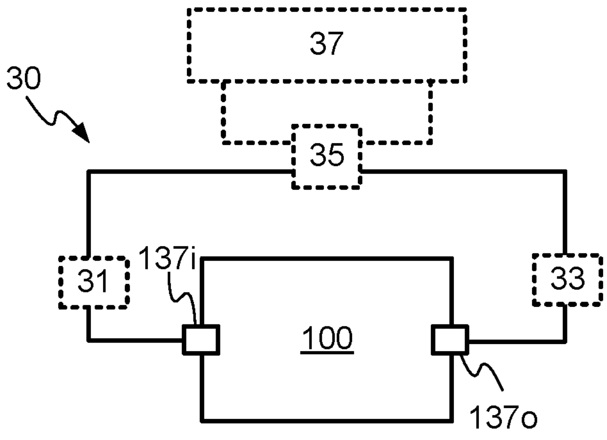
FIG. 9 is an exemplary block diagram of an electrical machine forming part of a fluid circuit of a vehicle according to some examples.

In FIG. 9, the electrical machine 100 is shown when forming part of the vehicle 10. In this example, the electrical machine 100 comprises the fluid ports 137*i*, 137*o*. The fluid ports 137*i*, 137*o* may be bidirectional or a fluid inlet 137*i* and a fluid outlet 137*o* as previously presented. The fluid ports 137*i*, 137*o* are connected by an external fluid circuit 30.

The external fluid circuit 30 may comprise one or more pump devices 35. The pump device 35 may be configurable to pump fluid into/out from the fluid ports 137*i*, 137*o* of the fluid circuit 130 of the electrical machine 100. The pump device 35 may control a pumping and/or draining effect of the fluid circuit 130. If the pump device 35 is configured to pump fluid 102 into the fluid inlet 137*i*, this will increase an amount of fluid 102 in the fluid circuit 130 and exert a braking torque on the rotor 120. If the pump device 35, e.g. at a later stage of operation, is configured to drain fluid 102 from the outlet 137*o*, a time it takes to decrease and remove a braking force exerted by the fluid 102 on the rotor 120 will decrease, and the electrical machine 100 may operate without any braking torque applied via the fluid 102. Advantageously, each side of the external fluid circuit 30, i.e. at both sides of the pump device 35, valve devices 31, 33 are provided.

The fluid circuit 30 may further comprise a fluid reservoir 37. The fluid reservoir 37 may be a sump or any other suitable reservoir 37. The pump device 35 may be configured to pump fluid 102 between the reservoir 37 and the fluid circuit 30.

As the fluid 102 brakes the rotor 120 of the electrical machine 100. The friction caused between the fluid 102 and the rotor 120 may cause the fluid 102 to heat. In order to no dissipate this heat, the external fluid circuit 30 may be operatively connected to, or form part of a temperature system of the vehicle 10. The temperature system may be configured to transfer heat to e.g. an interior of the vehicle 10 and/or to the energy system 20 of the vehicle 10.

As previously indicated, the fluid 102 is advantageously an oil.

Figure 10:
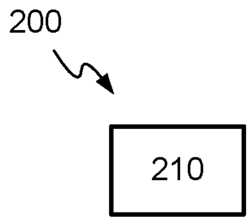
FIGS. 10-11 are exemplary schematic views of methods according to some examples.

FIG. 10 is a schematic view of a method 200 for exerting a braking torque on a rotor 120 of an electrical machine 100 according to any example and comprising any feature presented herein. The method 200 comprises controlling 210 a viscous drag of the fluid circuit 130 of the electrical machine 100. The viscous drag may be controlled according to any example or feature presented herein.

Figure 11:
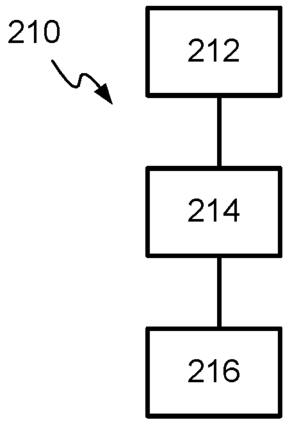

In FIG. 11, optional examples of controlling 210 the viscous drag of the fluid circuit 130 are shown. Although the options are explained and illustrated in a particular order, this is for explanatory purposes only. The different features of FIG. 11 may be implemented separately or combined in any suitable constellation and executed in any order.

Controlling 210 the viscous drag of the fluid circuit 130 may comprise providing 212 fluid 102 at an inlet 137*i* of the fluid circuit 130. As explained, increasing the amount of fluid 102 in the fluid circuit 130 will increase the viscous drag and thereby increase retardation of the rotor 120.

Additionally, or alternatively, controlling 210 the viscous drag of the fluid circuit 130 may comprise draining 214 fluid at an outlet 137*o* of the fluid circuit 130. As explained, decreasing the amount of fluid 102 in the fluid circuit 130 will decrease the viscous drag and thereby decrease retardation of the rotor 120.

Additionally, or alternatively, controlling 210 the viscous drag of the fluid circuit 130 may comprise controlling 216 the width extension w of the fluid circuit 130. As explained, increasing the width extension w of the fluid circuit 130 will decrease the viscous drag and thereby decrease retardation of the rotor 120. Decreasing the width extension w of the fluid circuit 130 will increase the viscous drag and thereby increase retardation of the rotor 120.

Example 1. An electrical machine 100 comprising a rotor 120, a stator 110, a housing 140 and a fluid circuit 130 provided between an interior of the housing 140 and the rotor 120 axially along a longitudinal axis A of the rotor 120, wherein the fluid circuit 130 is adapted to, by means of a fluid 102 in the fluid circuit 130, exert a braking torque on the rotor 120.

Example 2. The electrical machine 100 of Example 1, wherein a width extension w of the fluid circuit 130 axially along the longitudinal axis A of the rotor 120 is defined by a first surface 121 and a second surface 131, 141 facing each other, the first surface 121 is provided by a surface 121 of the rotor 120.

Example 3. The electrical machine 100 of Example 2, wherein the first surface 121 and the second surface 131, 141 are respectively provided with one or more vanes 135 adapted to fluidly engage vanes 135 of the other surface 121, 131, 141 to provide a viscous drag between the surfaces 121, 131, 141.

Example 4. The electrical machine 100 of Example 2 or 3, wherein the second surface 131, 141 is provided by a surface 141 of the housing 140.

Example 5. The electrical machine 100 of Example 2 or 3, wherein the fluid circuit 130 further comprises an intermediate part 132 rotatably arranged on the longitudinal axis A of the rotor 120 axially between the rotor 120 and the housing 140, the second surface 131, 141 is provided by a surface 131 of the intermediate part 132.

Example 6. The electrical machine 100 of any one of Examples 2 to 5, wherein the first surface 121 and/or the second surface 131 is movable along the rotational axis X to control the width extension w of the fluid circuit 130.

Example 7. The electrical machine 100 of Example 6, wherein the fluid circuit 130 further comprises a substantially constant amount of fluid 102.

Example 8. The electrical machine 100 of any one of Examples 1 to 6, wherein the fluid circuit 130 further comprises at least one fluid inlet 137*i* for receiving the fluid 102 into the fluid circuit 130 and at least one fluid outlet 137*o* for draining the fluid 102 from the fluid circuit 130.

Example 9. The electrical machine 100 of any one of the preceding Examples, wherein the fluid circuit 130 forms part of a cooling system of the electrical machine 100.

Example 10. The electrical machine 100 of any one of Examples 1 to 8, further comprising a Water Ethanol Glycol, WEG, cooling system.

Example 11. The electrical machine 100 of any one of the preceding Examples, wherein the fluid circuit 130 is arranged at a side of the stator 110 proximal to a drive shaft 150 of the electrical machine 100.

Example 12. The electrical machine 100 of any one of Examples 1 to 10, wherein the fluid circuit 130 is arranged at a side of the stator 110 distal to a drive shaft 150 of the electrical machine 100.

Example 13. The electrical machine 100 of any one of the preceding Examples, wherein the electrical machine is a propulsion motor for a vehicle 10.

Example 14. The electrical machine 100 of any one of Examples 1 to 12, wherein the electrical machine 100 is an alternator.

Example 15. The electrical machine 100 of Example 1, wherein a width extension w of the fluid circuit 130 axially along the longitudinal axis A of the rotor 120 is defined by a first surface 121 and a second surface 131, 141 facing each other, the first surface 121 is provided by a surface 121 of the rotor 120; the first surface 121 and the second surface 131, 141 are respectively provided with one or more vanes 135 adapted to fluidly engage vanes 135 of the other surface 121, 131, 141 to provide a viscous drag between the surfaces 121, 131, 141; wherein the second surface 131, 141 is provided by a surface 141 of the housing 140 or the fluid circuit 130 further comprises an intermediate part 132 rotatably arranged on the longitudinal axis A of the rotor 120 axially between the rotor 120 and the housing 140 and the second surface 131, 141 is provided by a surface 131 of the intermediate part 132; the first surface 121 and/or the second surface 131, 141 is movable along the rotational axis X to control the width extension w of the fluid circuit 130 and the fluid circuit 130 further comprises a substantially constant amount of fluid 102; the fluid circuit 130 further comprises at least one fluid inlet 137*i* for receiving the fluid 102 into the fluid circuit 130 and at least one fluid outlet 137*o* for draining the fluid 102 from the fluid circuit 130; the fluid circuit 130 forms part of a cooling system of the electrical machine 100; the electrical machine 100 further comprises a Water Ethanol Glycol, WEG, cooling system; the fluid circuit 130 is arranged at a side of the stator 110 proximal to a drive shaft 150 of the electrical machine 100 or the fluid circuit 130 is arranged at a side of the stator 110 distal to a drive shaft 150 of the electrical machine 100; the electrical machine is a propulsion motor for a vehicle 10 or the electrical machine 100 is an alternator.

Example 16. A vehicle 10 comprising the electrical machine according to any of the preceding Examples.

Example 17. The vehicle 10 of Example 16, wherein the electrical machine 100 comprises at least one fluid inlet 137*i* for receiving the fluid 102 into the fluid circuit 130 and at least one fluid outlet 137*o* for draining the fluid 102 from the fluid circuit 130, wherein the fluid inlet 137*i* and fluid outlet 137*o* are operatively connected to a temperature system of the vehicle 10.

Example 18. A method 200 of exerting a braking torque on the rotor 120 of an electrical machine 100 of any one of Examples 1 to 15, the method 200 comprising: controlling 210 a viscous drag of the fluid circuit 130.

Example 19. The method of Example 18, wherein controlling 210 a viscous drag of the fluid circuit 130 comprises providing 212 fluid 102 at an inlet 137*i* of the fluid circuit 130 and/or draining 214 fluid at an outlet 137 of the fluid circuit 130.

Example 20. The method of Example 18 or 19, wherein controlling 210 a viscous drag of the fluid circuit 130 comprises a controlling 216 a width extension w of the fluid circuit 130, the width extension w is defined along the longitudinal axis A by a distance between a first surface 131 and an opposing second surface 133 of the fluid circuit 130.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. An electrical machine comprising a rotor, a stator, a housing and a fluid circuit provided between an interior of the housing and the rotor axially along a longitudinal axis of the rotor, wherein a width extension of the fluid circuit axially along the longitudinal axis of the rotor is defined by a first surface and a second surface facing each other, the fluid circuit is adapted to, by means of a fluid in the fluid circuit, exert a braking torque on the rotor responsive to one of the first surface or the second surface being non-rotating, and the other of the first surface or the second surface rotating, wherein the first surface and/or the second surface is movable along the rotational axis to control the width extension of the fluid circuit.

2. The electrical machine of claim 1, wherein the first surface is provided by a surface of the rotor.

3. The electrical machine of claim 1, wherein the first surface and the second surface are respectively provided with one or more vanes adapted to fluidly engage vanes of the other surface to provide a viscous drag between the surfaces.

4. The electrical machine of claim 1, wherein the second surface is provided by a surface of the housing.

5. The electrical machine of claim 1, wherein the fluid circuit further comprises an intermediate part rotatably arranged on the longitudinal axis of the rotor axially between the rotor and the housing, the second surface is provided by a surface of the intermediate part.

6. The electrical machine of claim 1, wherein the fluid circuit further comprises a substantially constant amount of fluid.

7. The electrical machine of claim 1, wherein the fluid circuit further comprises at least one fluid inlet for receiving the fluid into the fluid circuit and at least one fluid outlet for draining the fluid from the fluid circuit.

8. The electrical machine of claim 1, wherein the fluid circuit forms part of a cooling system of the electrical machine.

9. The electrical machine of claim 1, further comprising a Water Ethanol Glycol cooling system.

10. The electrical machine of claim 1, wherein the fluid circuit is arranged at a side of the stator proximal to a drive shaft of the electrical machine.

11. The electrical machine of claim 1, wherein the fluid circuit is arranged at a side of the stator distal to a drive shaft of the electrical machine.

12. The electrical machine of claim 1, wherein the first surface is provided by a surface of the rotor; the first surface and the second surface are respectively provided with one or more vanes adapted to fluidly engage vanes of the other surface to provide a viscous drag between the surfaces; wherein the second surface is provided by a surface of the housing or the fluid circuit further comprises an intermediate part rotatably arranged on the longitudinal axis of the rotor axially between the rotor and the housing and the second surface is provided by a surface of the intermediate part; the first surface and/or the second surface is movable along the rotational axis to control the width extension of the fluid circuit; the fluid circuit further comprises at least one fluid inlet for receiving the fluid into the fluid circuit and at least one fluid outlet for draining the fluid from the fluid circuit; the fluid circuit forms part of a cooling system of the electrical machine; the electrical machine further comprises a Water Ethanol Glycol cooling system; the fluid circuit is arranged at a side of the stator proximal to a drive shaft of the electrical machine or the fluid circuit is arranged at a side of the stator distal to a drive shaft of the electrical machine; the electrical machine is a propulsion motor for a vehicle or the electrical machine is an alternator.

13. A method of exerting a braking torque on the rotor of an electrical machine of claim 1, the method comprising:

controlling a viscous drag of the fluid circuit by controlling a width extension of the fluid circuit, wherein the first surface and/or the second surface of the fluid circuit is movable along the rotational axis.

14. The method of claim 13, wherein controlling a viscous drag of the fluid circuit comprises:

providing fluid at an inlet of the fluid circuit and/or draining fluid at an outlet of the fluid circuit.

* * * * *